US006667011B1

(12) United States Patent
Munje et al.

(10) Patent No.: US 6,667,011 B1
(45) Date of Patent: Dec. 23, 2003

(54) HEAT EXCHANGER WITH CATALYST

(75) Inventors: Satish R. Munje, Toledo, OH (US); Bruce A. McKenna, Sylvania, OH (US)

(73) Assignee: Exothermics, Inc., Toledo, OH (US)

( * ) Notice: Subject to any disclaimer, the term of this patent is extended or adjusted under 35 U.S.C. 154(b) by 0 days.

(21) Appl. No.: 09/531,826

(22) Filed: Mar. 21, 2000

(51) Int. Cl.$^7$ .............................. F01N 3/10; B01D 53/34
(52) U.S. Cl. ..................... 422/173; 422/177; 422/180
(58) Field of Search ................................ 422/176, 171, 422/177, 173, 180; 165/166–167

(56) References Cited

U.S. PATENT DOCUMENTS

| | | | | |
|---|---|---|---|---|
| 3,362,783 A | * | 1/1968 | Leak | 422/180 |
| 3,910,042 A | * | 10/1975 | Yuge et al. | 422/173 |
| 4,285,838 A | * | 8/1981 | Ishida et al. | 502/527.21 |
| 4,541,480 A | | 9/1985 | Beckmann | |
| 4,852,640 A | | 8/1989 | McKenna | |
| 5,512,250 A | * | 4/1996 | Betta et al. | 422/173 |
| 5,711,071 A | | 1/1998 | Fromson et al. | |
| 5,738,024 A | | 4/1998 | Winegar | |
| 5,846,494 A | * | 12/1998 | Gaiser | 422/173 |

OTHER PUBLICATIONS

Kanthal Handbook: Resistance Heating Alloys for Industrial Furnaces, Kanthal Corp. Sweden (Oct. 1992).
ALCOA Technical Bulletin: Preparation and Rheology of HiQ Alumina Dispersion, ALCOA Corp. (Jul. 1995).
ALCOA Technical Bulletin: Calcination of HIQ Alumina, ALCOA Corp. (Jul. 1995).
Technetics Sales Bulletin: TC–883: Feltmetal Materials and Applications, Technetics Corp (Aug. 1995).
Catalytic Combustion Corp Bulletin #2010: Ceramic Supported Oxidation Catalyst (1995).
New Catalyst Technologies of the Destruction of Halogenated Hydrocarbons and Volatile Organics. For presentation at the 85th Annual Meeting & Exhibition, Kansas City, Missouri (Jun. 21–26, 1992).

* cited by examiner

Primary Examiner—Hien Tran
(74) Attorney, Agent, or Firm—Emch, Schaffer, Schaub & Porcello Co., L.P.A.

(57) ABSTRACT

A recuperative heat exchanger with a catalyst comprises a heat exchanger core composed of a plurality of spaced apart plate members. The plate members are positioned in adjacent and substantially parallel relationship. The plate members define a first plurality of passageways and a second plurality of passageways which extend between the spaced apart plate members. The first plurality of passageways is separate from the second plurality of passageways. The first plurality of passageways is disposed for receiving high temperature exhaust gases while the second plurality of passageways is disposed for receiving supply air. A catalyst material, comprising a support material coated or impregnated with a suitable catalytic agent for removal of pollutants, is disposed within the first plurality of passageways.

20 Claims, 6 Drawing Sheets

HEAT EXCHANGER WITH CATALYST

TECHNICAL FIELD

This invention relates to a heat exchanger which contains catalyzed screens and/or felt metal cloth for removing materials such as pollutants and other impurities from exhaust gases another fluids while simultaneously recovering heat energy from the gaseous exhaust or other fluids.

BACKGROUND OF THE INVENTION

In the past, heat exchangers have been used to recover energy from exhaust gases so that this energy can be reused for other purposes. Plate type heat exchangers are commonly used for achieving an indirect heat transfer between two fluids circulating at different temperatures. These heat exchangers generally consist of a plurality of spaced parallel plates welded or otherwise attached between two end plates to define parallel passages. Manifolds are attached to the ends of the passages to direct each fluid to alternate passages so that each plate forms a heat conducting interface between the two fluids.

Recuperative heat exchangers have been used to remove impurities from exhaust gases. These exhaust gases contain various pollutants, such as $NO_x$, CO and VOC type gases. In the past, various heat exchangers have attempted to remove the pollutant gases from the exhaust gas by having a catalyst coated on the heat exchanger plates. For example, in the Winegar, U.S. Pat. No. 5,738,024, a catalyst is coated on heat exchanger elements. Also, in the Fromson et al., U.S. Pat. No. 5,711,071, an extended heated exchange surface or fin of a heat exchanger has a catalyst material firmly anchored as nodules formed on the fins. In the Fromson et al. patent, the metal surface containing a catalyst material is not formed as an integral part of the heat exchanger. Rather, in the Fromson et al. '071 patent, the catalyst material is on a grid structure or screen or wire mesh structure which is located adjacent and downstream from the heat exchanger with respect to the direction of air flow, so that the air flowing over and through the catalyst structure is air that first comes through and is heated by the heat exchanger. However, there is difficulty when utilizing such heat exchanges since much of the pollutant material in the exhaust gases is not removed from the exhaust gas. Accordingly, the exhaust gases are not sufficiently cleaned to meet either emission standards or to be reused in a recuperative heat exchanger. Accordingly, it is the object of the present invention to provide a heat exchanger with a catalyst which substantially removes pollutants from exhaust gases.

It is a further object of the invention to provide a heat exchanger where a mesh or screen catalytic material is placed within the passageways of a heat exchanger material, such that exhaust gases come into contact with and flow through the catalyst coated mesh material as the heat is being removed from the exhaust gases.

It is a further object of the invention to provide a heat exchanger having high efficiency or removing materials such as pollutants and other impurities and for recovering energy from exhaust gases so the energy can be used for other processes.

Other objects and advantages of the invention will be apparent from the following detailed description of the invention.

SUMMARY OF THE INVENTION

This invention is directed to a heat exchanger with a catalyst having a heat exchanger core composed of a plurality of spaced apart plate members. The core is disposed for receiving high temperature exhaust gases. The plate members define a set of first passageways for receiving exhaust gases and a plurality of second passageways through which cooling heat transfer gases flow. A catalyst material is positioned in the first passageways such that the exhaust gases pass through the catalyst material as the heat energy is being recovered from the exhaust gases. The catalyst material comprises a support material such as a mesh screen or felt metal cloth coated or impregnated with a suitable catalytic agent.

DESCRIPTION OF THE PREFERRED EMBODIMENT

The present invention is directed to a recuperative heat exchanger having a catalytic screen material within the heat exchanger. More specifically, the invention is directed to a heat exchanger with built-in catalytic capabilities for removing pollutants from exhaust gases. The features of the invention will be more fully understood by referring to the attached drawings in connection with the following description.

Figure 1:
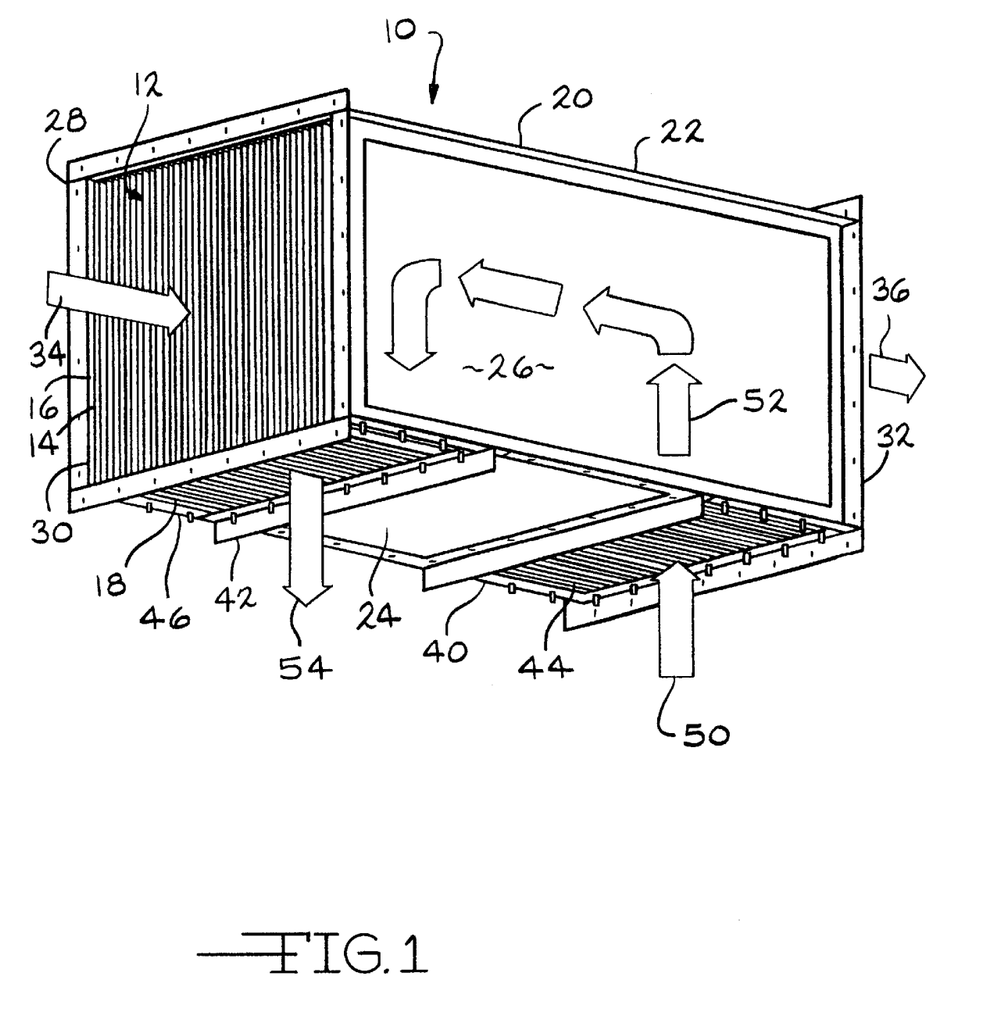
FIG. 1 is a perspective view of a heat exchanger.
Figure 3:
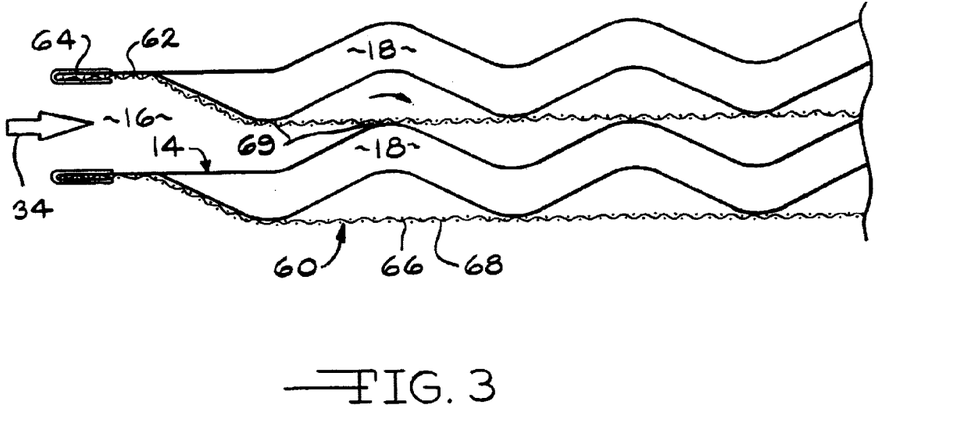
FIG. 3 is a schematic side elevational view of one embodiment of a plurality of heat exchanger plates and mesh catalytic material in a sinusoidal configuration.

A recuperative heat exchanger 10 has a core 12 composed of a plurality of spaced apart plate members 14. The plate members 14 define a first plurality of passageways 16, as seen in FIGS. 1 and 3, and a second plurality of passageways 18, as seen in FIGS. 1 and 3.

The first plurality of passageways 16 formed by the plate members 14 are disposed for receiving high temperature exhaust gases, as shown by the arrow 34 that pass through the exchanger 10 in one direction. The plate members 14 of the core 12 are made of any material that is capable of withstanding high temperatures. In a preferred embodiment, the plate material can be a high nickel alloy steel. Suitable high nickel alloy steels include, for example, 309, 304 and 316 types of stainless steel. To allow heat transfer across the plate members 14, it is necessary that the plate members 14 are made of a relatively thin material to facilitate this heat transfer. The plate members 14 are usually formed from a high temperature alloy having a thickness of about 28 gage to about 24 gage. A practice has been found that using a material having a thickness of substantially 26 gage works particularly well in providing the plate member 14 with enough strength to properly function as a core of a heat exchanger, while being thin enough to readily allow heat to be transferred through the plates of the core. Although examples of materials and thicknesses of materials have been given for the plates of the core, it should be understood that these examples are not meant to be limiting. Other materials and thicknesses can be used, depending on the size and intended area of use for the heat exchanger.

The heat exchanger 10 further comprises a case member 20 which has a top 22, a bottom 24, two substantially parallel sides 26 and 28. The case member 20 defines an exhaust gas inlet opening 30 and an exhaust gas discharge opening 32. The exhaust gas inlet opening 30 and the exhaust gas discharge opening 32 are disposed in an opposed substantially parallel relationship at opposite ends of the case member 20. The first plurality of passageways 16 formed by the plates 14 extends between the exhaust gas inlet opening 30 and the exhaust gas discharge opening 32. The exhaust gas inlet opening 30 and the exhaust gas discharge opening 32 are positioned so that high temperature exhaust gases, indicated by the arrow 34, can move through the first plurality of passageways 16 formed by the plates 14 of the heat exchanger 10 from the exhaust gas inlet opening 30 to the exhaust gas discharge opening 32. The cooled and cleaned exhaust gases, as indicated by arrow 36, passes from the heat exchanger 10 through the exhaust gas discharge opening 32. The core 12 is secured to the case member 20 in the area of the exhaust gas inlet opening 30 and exhaust gas discharge opening 32 in such a manner that the plate members 14 of the core 12 are securely attached to the case member 20 at the ends of the case member 20. It is to be understood that various techniques, including welding techniques as described in U.S. Pat. No. 4,541,480 in the teachings of U.S. Pat. No. 4,852,640 with regard to spray deposit welding techniques are incorporated by reference to this patent application.

On the bottom 24 of the case member 20 are two projections 40 and 42 that extend from the case member 20 in a direction away from the core 12. The ends of the projection 40 that are spaced apart from the case member 20 define a supply air inlet opening 44. The ends of the projection 42 that are spaced apart from the case member 20 define a supply air discharge opening 46. The supply air inlet opening 44 and the supply air discharge opening 46 are positioned to be substantially perpendicular to the exhaust gas inlet opening 30 and the exhaust gas discharge opening 32 at the ends of the case member 20. The supply air inlet opening 44 is positioned adjacent the exhaust gas discharge opening 32. The supply air discharge opening 46 is positioned adjacent the exhaust gas inlet opening 30. The supply air inlet opening 44 and the supply air discharge opening 46 are in communication with the second plurality of passageways 18 defined by the plate members 14. The supply air inlet opening 44 is positioned to allow a supply air, as indicated by the arrow 50, to enter the case member 20, pass through the second plurality of passageways 18 in the core 12, as indicated by the arrows 52, and then be discharged from the case member 20, as indicated by the arrow 54, through the supply air discharge opening 46. Thus, the supply air follows a substantially U-shaped configuration from the supply air inlet opening 44 to the supply air discharge opening 46.

To reduce the differential thermal expansion and contraction between the case member 20 and the core 12, it is desirable to have the case member 20 formed from a high temperature alloy material essentially the same as used for the plates 14 and having a thickness that is not much greater than the thickness of the material used to form the plates 14 in the core 12. However, it is desirable to increase the thickness of the material used to form the case member 20 to provide additional strength and support in the case member which, in turn, provides additional strength and support for the plates 14 of the core 12 located within the case member 20. Accordingly, it has been found that a case member using the material having a thickness of about 22 gage to about 18 gage will work well in providing the case member 20 with acceptable expansion and contraction characteristics. In practice, it has been found that using a material for the case member 20 has a thickness of 20 gage works particularly well when using a material for the plates 14 that has a thickness of 26 gage. Although examples of materials and thicknesses have been given for the case member 20, other thicknesses and materials can be used depending on the size and attended use of the heat exchanger. However, to provide acceptable expansion and contraction characteristics and acceptable strength, it is preferable to have the material forming the case member 20 to be from about ½ to about three times the thickness of the material used to form the plate members 14 in the core 12. While not shown, it is to be understood that the core 12 and case member 20 are preferably positioned in a jacket which provides primary structural strength and protects the core and case member of the heat exchanger. Also, a filler material can be positioned between the jacket and the case member to provide additional stability and insulation. The jacket also allows the recuperative heat exchanger 10 to be connected to other process equipment so that hot exhaust gases can be supplied to exhaust gas inlet opening 30 and the exhaust gases cleaned and discharged from the recuperative heat exchangers through exhaust gas discharge opening 32. The jacket also allows the heat exchanger 10 to be connected to additional process equipment to allow supply air to be directed to the heat exchangers through the supply air inlet opening 44 and discharged from the supply air discharge opening 46.

Figure 2:
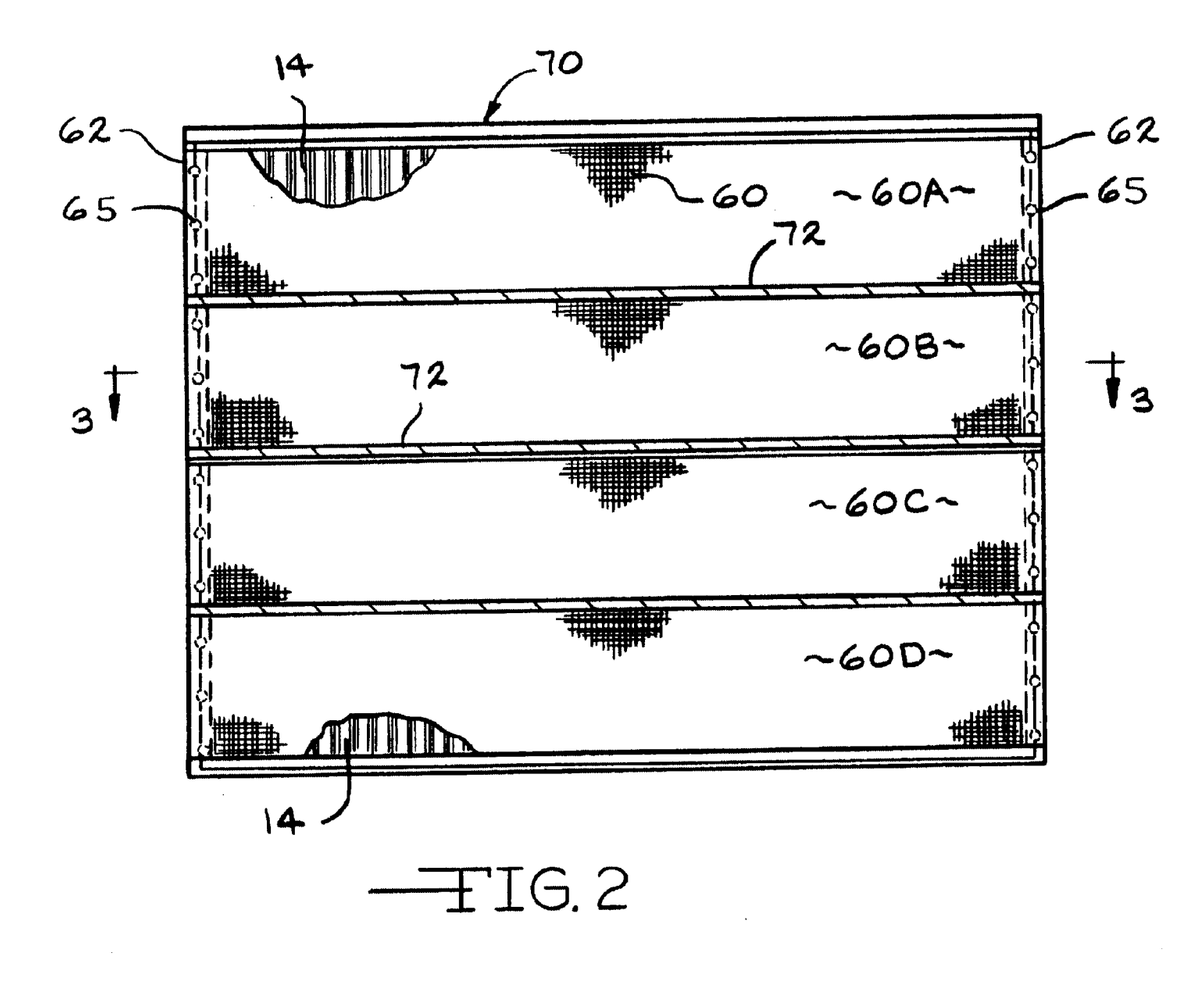
FIG. 2 is a side elevation view, partially broken away, of a wire mesh screen catalytic material.

Referring now to FIGS. 2 and 3, a catalyst material 60 is positioned within each first plurality of passageways 16. The catalyst material 60 is secured to end portions 62 of the plate 14 by at least one securing mechanism 64, such as clip or other crimping means or by spot welding.

The catalyst material 60 is made of a suitable support material 66 and a catalytic agent 68. The support material 66 is capable of withstanding high temperatures and has expansion and contraction characteristics that are compatible with the materials comprising the plate members 14. The support material 66 can be a porous material such as a wire mesh material made of a suitable gage wire or felt metal cloth.

The support material 66 is coated with the suitable catalytic agent 68 which reacts with pollutants in the exhaust gases. When the exhaust gases flow through the first plurality of passageways 16 and catalyst material, the exhaust gases react with the catalytic agent 68 on the catalyst material 60. This reaction changes the chemical composition of the pollutants and oxidizes the pollutants to harmless components. As the exhaust gas passes through the passageways 16, the exhaust gases follow the contours of plate members 14, which as shown in FIG. 3, have a sinusoidal shape. The exhaust gases while passing through the catalyst material 60 come into contact with the catalyst material 60 multiple times as the exhaust gases pass through the heat exchanger, thereby increasing the efficiency of oxidation of pollutants in the exhaust gases.

In operation, hot exhaust gases are directed to the exhaust gas inlet opening 30, such as the exhaust gases pass through the first plurality of passageways 16 in the plate members 14 in the core 12 of the heat exchangers 10. The exhaust gases are passed through the catalyst material 60 a plurality of times. The exhaust gases are discharged from the heat exchanger 10 through the exhaust gas discharge opening 32 in the case member 20. The exhaust gases pass through the first plurality of passageways 16 formed by the plate members 14 in a substantially straight path from the exhaust gas inlet opening 30 to the exhaust gas discharge opening 32.

To recover heat from the exhaust gases and from the heat of reaction of the catalytic agent and pollutants that are passing through the heat exchanger 10, supply air indicated by arrow 50 is introduced through the supply air inlet opening 44 on one side of the heat exchanger 10. The supply air inlet opening 44 is positioned adjacent the exhaust gas discharge opening 32. The supply air passes through the air inlet opening 44 and into the second plurality of passageways 18 defined by the plates 14 in the core 12. The supply air is removed from the core 12 through the supply air discharge opening 46. Thus, the supply air moves through the heat exchanger in a direction that is generally opposite to the direction of travel of the high temperature exhaust gases.

Referring now to FIG. 2, a top or plan view of one of the plates 14 shows the catalyst material 60 positioned adjacent one side of each of the plate members 14. In a preferred embodiment, at least one frame member 70 supports the catalyst material 60 and provides primary structural strength to the catalyst material 60. The catalyst material 60 extends to the ends of the parallel plate members 14 such that the catalyst material 60 has approximately the same length and width dimensions as the plate members 14. In a preferred embodiment, the catalyst material 60 has at least one end portion 62 which is free of any catalytic agent 68 material. The catalyst material 60 is suitably attached, for example by being spot welded, at areas 65 to the frame member 70. In various embodiments, the frame member 70 can have at least one, and in certain embodiments, a plurality of structural cross pieces 72 which extend from one end of the catalyst material 60 to an opposing end of the catalyst material 60 to provide further structural strength and integrity. It is within the contemplated scope of the present invention that the catalyst material 60 can be positioned as panels 60A, 60B, 60C and 60D on the frame member 70, as shown in FIG. 2, of ease in manufacturing and assembling of the heat exchanger.

Figure 4:
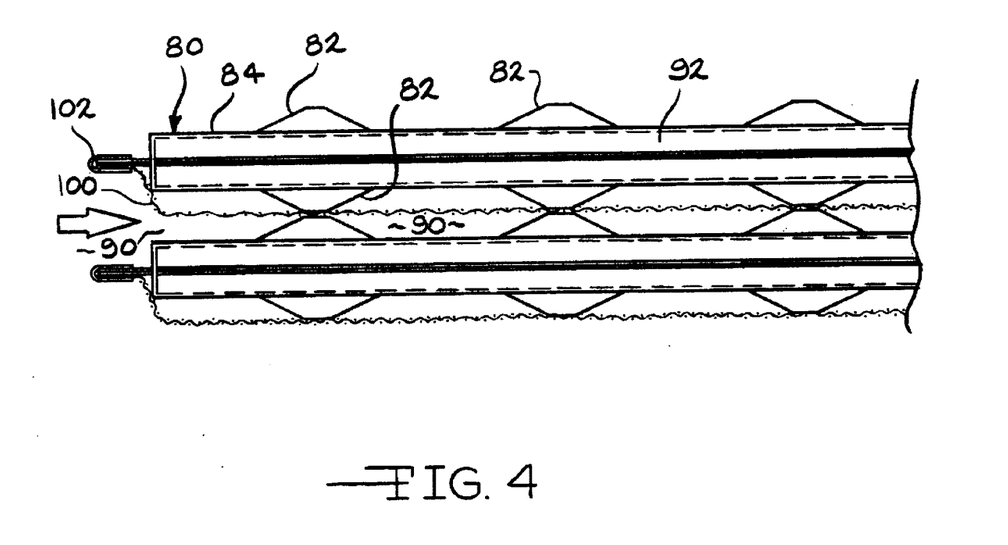
FIG. 4 is a schematic side elevational view of another embodiment of a plurality of heat exchanger plates and mesh catalytic material in a dimpled configuration.

FIG. 4 shows an alternative embodiment of a plurality of spaced apart plate members 80. The plate members define a plurality of extending portions or dimples 82 which extend from a surface 84 of the plate members 80. In a preferred embodiment, the raised or dimpled portions 82 can be present in a spaced apart patterned relationship to facilitate air flow through the plate members 80. The plate members can be made of any suitable high temperature material, as discussed above. The plate members 80 define a first plurality of passageways 90 which are disposed for receiving high temperature exhaust gases that pass through the exchanger in one direction. The plate members 80 further define a second plurality of passageways 92 through which supply air is passed, as in a manner described above. A catalyst material 100, substantially the same as described above, is positioned in the passageway 90 and is secured to ends of the plate member 80 by a clip or other securing means 102 or by spot welding. As the exhaust gas is passed through the first plurality of passageways 90, the exhaust gases pass through the catalyst material 100, coming into contact with the catalyst on the support material, thereby removing pollutants and impurities from the exhaust gases. Simultaneously, the exhaust gases are being cooled by the supply of air moving in an opposite direction through the second plurality of passageways 92.

It is to be understood that different types of catalytic materials can be used in the present invention in any desired combination. The support material can be treated with an Alumina oxidizing wash coating and coated with a catalytic material to provide an optimum catalytic screen material. It is to be understood that any heat generated by the catalytic reaction can also be recovered by the heat exchanger. It is also to be understood that the optimum catalyst to be used depends on the type of pollutants and noxious gases in the exhaust gas materials. Various catalysts can be used in accordance with the present invention from both those presently existing and those developed in the future. Useful catalytic materials can comprises a catalyst from the platinum group of metals, including platinum, palladium and rhodium. Other useful catalytic agents contemplated include oxides of base metals, such as cerium, chromium, cobalt, copper, iron, manganese, molybdenum, silica, tin, tungsten, zirconium, titanium, vanadium, zeolites and combinations of these materials.

It is to be understood that suitable support materials can include a plain weave wire mesh, felt metal cloth or any porous material that will give a desired surface area per unit volume of that material. Porosity (50–60%) of the support material is preferably such that air pressure drops in the heat exchanger meet acceptable standards.

One suitable support material is a market grade wire cloth with various mesh counts per inch, such as mesh sizes from 12–18. A mesh count of 16 gives a surface area-to-volume ratio of 633 ft2/ft3 and acceptable pressure drops.

Another suitable support material is a felt metal cloth made up of metal fibers (for example, 6 to 25 micrometer diameter) that are sintered together to form a porous cloth of desired porosity, surface area-to-volume ratio and thickness.

The compositions of the support materials can be high chromium (16–20% chromium) stainless steel such as 304Ss and 316Ss. Another suitable material is a ferritic stainless steel with about 22% chromium, 5–6% aluminum and balance is iron. The trade name for this alloy is FeCrAly or Kanthal®. When high chrome 304Ss or 316Ss is oxidized in a furnace, chromium forms a thin layer of $Cr_2O_3$ on its surface. In case of FeCrAly or Kanthal the layer is made up of $Al_2O_3$. These oxides help the alumina wash coat adhere better to the surface of the support material.

EXAMPLE

The CO destruction efficiency of an heat exchanger containing $Pt/Al_2O_3$ coated wire mesh screens was examined.

Preparation: One hundred 316Ss, #16 wire mesh screens (8"×24") were oxidized for one hour at 995° C., cooled, and then coated with $Al_2O_3$ wash coat. After drying at room temperature, the screens were calcined at 500° C. The target $Al_2O_3$ loading was 1.60 g/in$^3$. The actual loadings were between 0.60 and 2.07 g/in$^3$. The screens were then dipped in an aqueous 8.16% Pt solution, dried, and calcined again at 500° C. The screens were then installed into the heat exchanger.

Figure 5:
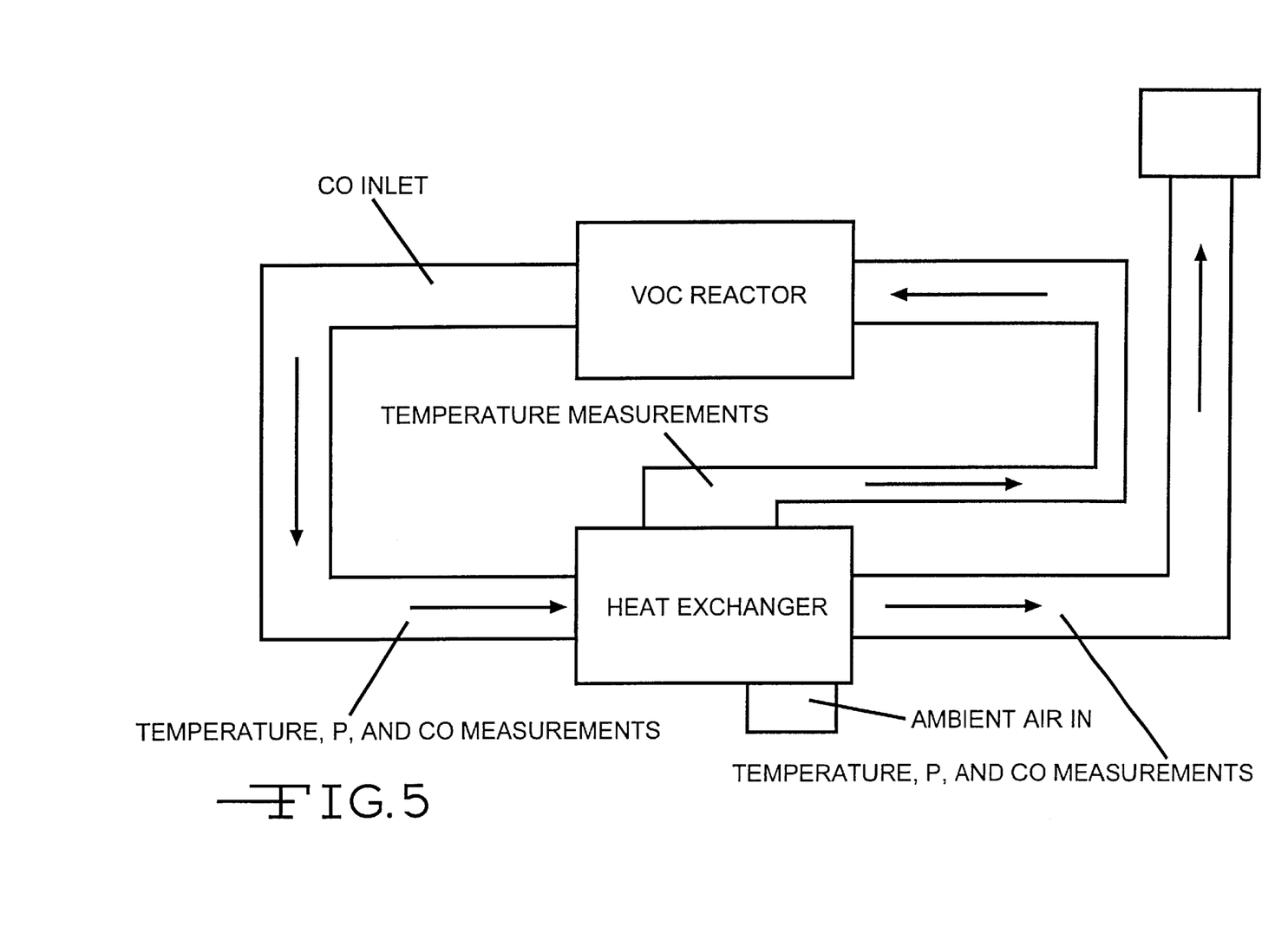
FIG. 5 is a schematic diagram of a heat exchanger testing apparatus.

Test: The heat exchanger was installed on a volatile organic compounds (VOC) reactor for testing (see FIG. 5). In order to test at high CO levels, CO was injected into the heat exchanger inlet flue gas stream by a mass flow transducer and controller (Matheson). Both 200 and 350 ppm of CO were utilized. Tests were performed at the following three flow rates: 275, 491 and 746 scfm. The temperatures were measured at the inlet and outlet of the heat exchanger. The inlet temperatures ranged from 75° F. to 525° F. Pressure drop measurements were also taken across the catalyst at various temperatures using a Magnehelic (Dwyer Instruments, Inc.) and the CO in the inlet and outlet was measured with a Thermo Environmental carbon monoxide analyzer.

Figure 6:
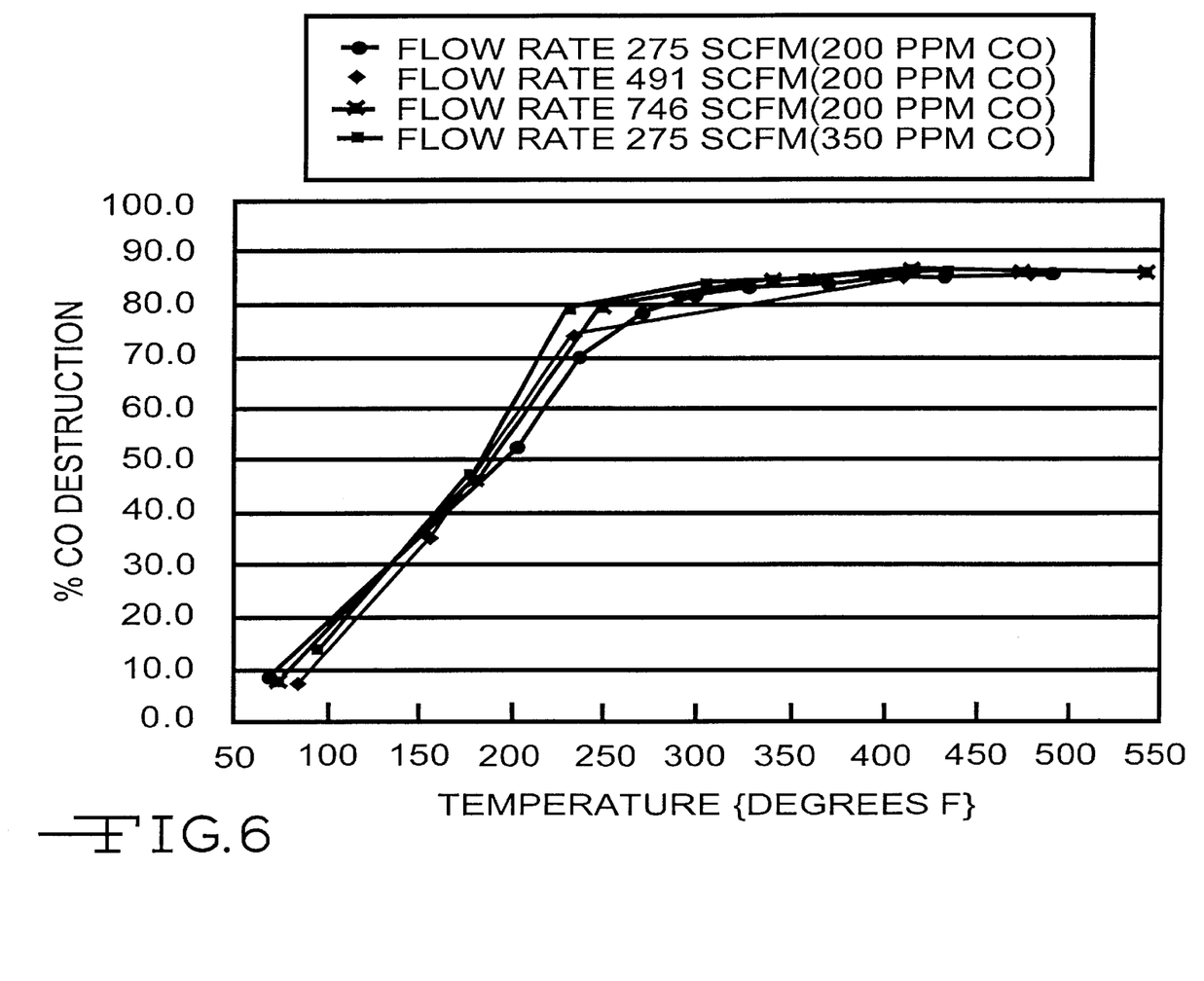
FIG. 6 is a graph showing the percent of CO oxidation over a catalytic coated 16 mesh stainless support material versus temperature for a heat exchanger.
Figure 7:
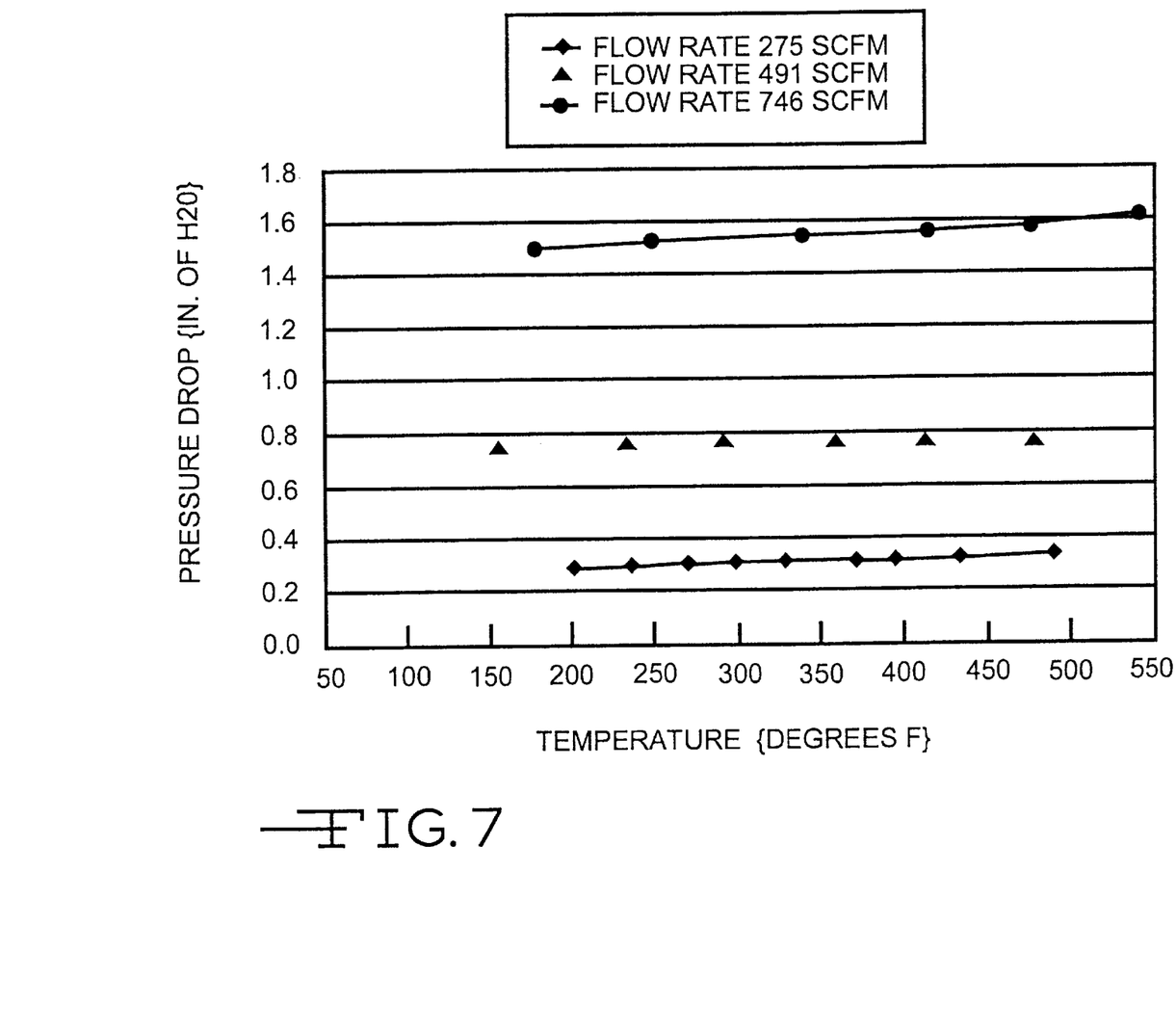
FIG. 7 is a graph showing the pressure drop versus temperature for the heat exchanger described in FIG. 6.

FIG. 6 shows the CO destruction increased with temperature until reaching a plateau at temperatures greater than 300° F. The maximum CO destruction obtained was determined to be 87%. This result was obtained at various flow rates of shown in FIG. 6. Even when the ambient air inlet of the heat exchanger was closed, hence, decreasing the change in temperature across the heat exchanger/catalyst, the 87% plateau was obtained. Pressure drop measurements were also obtained during the above experiments. The results are summarized in Table 1 below and in FIG. 7.

TABLE 1

Determined pressure drops in inches of water across the heat exchanger/catalyst.

| Temperature (° F.) | 275 scfm | 491 scfm | 746 scfm |
| --- | --- | --- | --- |
| 300 | 0.29 | 0.75 | 1.50 |
| 400 | 0.31 | 0.76 | 1.52 |
| 500 | 0.32 | 0.77 | 1.54 |
| 600 | 0.32 | 0.77 | 1.56 |
| 700 | 0.33 | 0.77 | 1.58 |
| 800 | 0.34 | 0.77 | 1.62 |

The above description of the invention is given for the sake of explanation. Various modifications and substitutions can be made without departing from the scope of the invention as defined by the following claims.

We claim:

1. A recuperative heat exchanger comprising a heat exchanger core composed of a plurality of spaced apart plate members, the plate members being positioned in adjacent and substantially parallel relationship and defining a first plurality of passageways and a second plurality of passageways extending between the spaced apart plate members, the first plurality of passageways being separate from the second plurality of passageways, the first plurality of passageways being disposed for receiving high temperature exhaust gases, the second plurality of passageways being disposed for receiving supply air; and a catalyst material being disposed within the first plurality of passageways in a spaced apart relationship to sides of the plate member defining the first passageways such that the exhaust gases pass through the catalyst material as heat energy is being recovered from the exhaust gases, the catalyst material comprising a porous support material coated or impregnated with a catalytic agent for removal of pollutants.

2. The recuperative heat exchanger of claim 1, wherein the heat exchanger core is disposed within a case member having a top, two substantially parallel sides, and a bottom positioned around the heat exchanger core, the case member having an exhaust gas inlet opening and an exhaust gas discharge opening, the exhaust gas inlet opening and exhaust gas discharge opening being in communication with the first plurality of passageways, wherein the high temperature exhaust gas is moved through the first plurality of passageways in the plate members from the exhaust gas inlet opening to the exhaust gas discharge opening; and the case member having a supply air inlet opening and a supply air discharge opening, the supply air inlet opening and the supply air discharge opening being in communication with the second plurality of passageways, the supply air inlet opening and the supply air discharge opening being disposed to direct supply air through the second plurality of passageways in the core, the core being secured to the case member at least at the exhaust gas inlet opening and the exhaust gas discharge opening to prevent escape of exhaust gases from the first plurality of passageways.

3. The heat exchanger of claim 2, wherein the exhaust gas inlet opening is disposed in opposed substantially parallel relationship to the exhaust gas discharge opening.

4. The heat exchanger of claim 3, wherein the supply air inlet opening is positioned adjacent the exhaust gas discharge opening and the supply air discharge opening is positioned adjacent the exhaust gas inlet opening, the supply air inlet opening and the supply air discharge opening being disposed to direct supply air through the second plurality of passageways in the heat exchanger core, the supply air passing through the core in a direction substantially opposite to the direction of travel of the exhaust gases passing through the core.

5. The heat exchanger of claim 2, wherein the plate members in the core and the case member are formed from a high nickel alloy stainless steel.

6. The heat exchanger of claim 5, wherein the material of the case member has a thickness that is from about 1½ to about three times the thickness of the material of the plate members in the core.

7. The recuperative heat exchanger of claim 2, further comprising projections extending from the case member in a direction away from the core, the projections defining a first passageway and a second passageway, the first passageway forming the supply air inlet opening and the second passageway defining the supply air discharge opening, the projections extending through the supply air inlet openings and the supply air discharge openings in the case member.

8. A heat exchanger of claim 7, wherein the supply air inlet and the supply air discharge openings are positioned substantially perpendicular to the exhaust gas inlet openings and the exhaust gas discharge openings.

9. The heat exchanger of claim 1, wherein the catalyst material is capable of converting noxious components of an exhaust gas stream comprising $NO_x$, CO and hydrocarbons into substances including $N_2$, $CO_2$ and $H_2O$.

10. The heat exchanger of claim 9, wherein the catalytic agent comprises at least one material selected from the platinum group of metals, including platinum, palladium and rhodium.

11. The heat exchanger of claim 9, wherein the catalytic agent comprising at least one oxide of a base material selected from cerium, chromium, cobalt, copper, iron, manganese, molybdenum, silica, tin, titanium, tungsten, vanadium, zirconium, zeolites and combinations thereof.

12. The heat exchanger of claim 1, wherein the plate members have a sinusoidal shape.

13. The heat exchanger of claim 1, wherein the plate members have a raised or dimpled configuration.

14. The heat exchanger of claim 1, wherein the support material comprises a porous wire mesh material.

15. The heat exchanger of claim 1, wherein the support material comprises a porous felt metal cloth.

16. The heat exchanger of claim 1, wherein the support material is secured to a frame member.

17. The heat exchanger of claim 16, wherein the frame member comprises at least one cross piece which extends from a first end of the frame member to an opposing end of the frame member.

18. The heat exchanger of claim 1, wherein the catalyst material is positioned within the first plurality of passageways whereby the exhaust gases are passed through the catalyst material a plurality of times.

19. The heat exchanger of claim 1, wherein the support material has a porosity of about 50 to 60%.

20. The heat exchanger of claim 1, wherein the catalyst material removes at least about 50% of CO pollutant at temperatures of about 200° F. and above.

* * * * *